April 8, 1930. F. SEIFFERT 1,753,723
VALVE
Filed Feb. 11, 1927
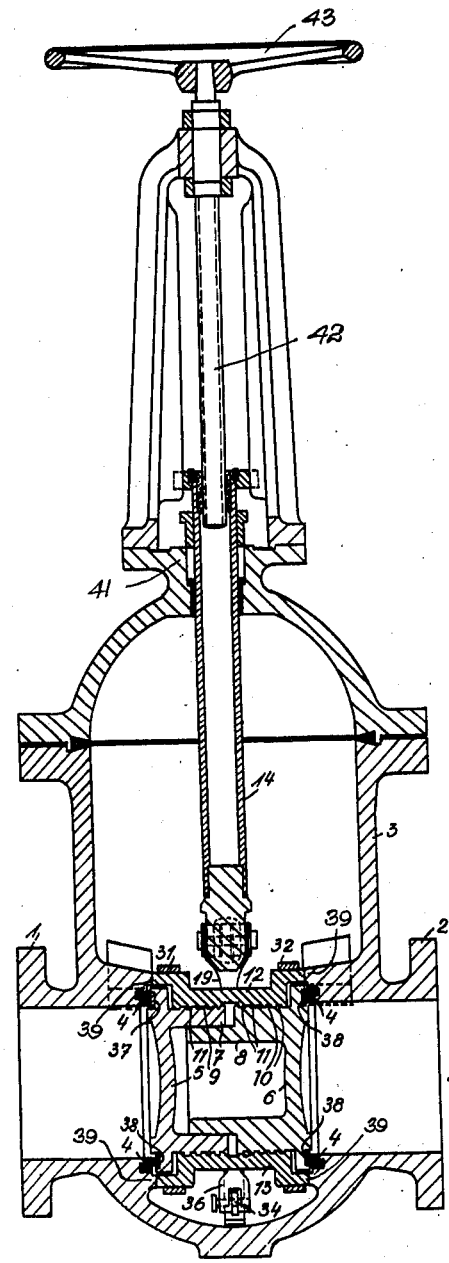
Fig. 1
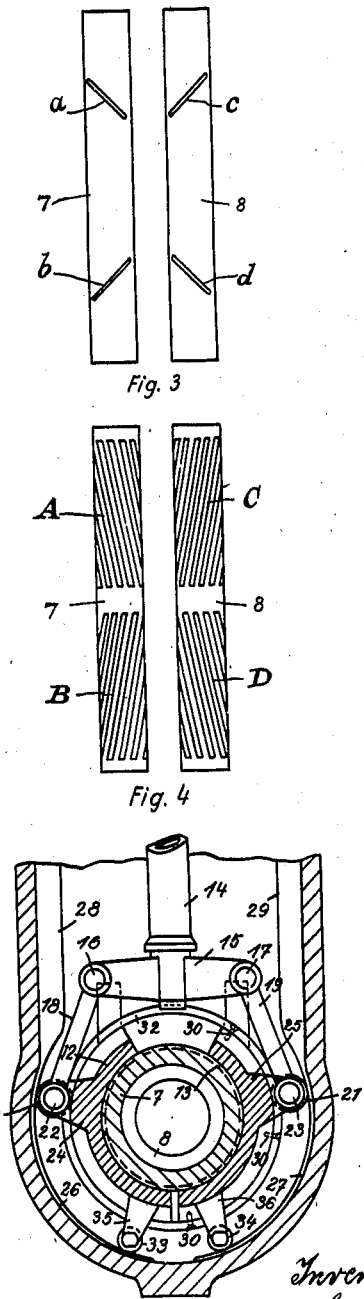
Fig. 3
Fig. 4
Fig. 2
Inventor:
Franz Seiffert Patented Apr. 8, 1930

1,753,723

UNITED STATES PATENT OFFICE

FRANZ SEIFFERT, OF BERLIN, GERMANY, ASSIGNOR TO THE FIRM FRANZ SEIFFERT & CO. AKTIENGESELLSCHAFT, OF BERLIN, GERMANY

VALVE

Application filed February 11, 1927, Serial No. 167,528, and in Germany October 21, 1925.

My invention relates to valves and more especially to gate valves of the type in which axial thrust is exerted on the valve plates in order to seat them tightly when the valve has been closed and to withdraw them from their seats before the valve is opened so as to prevent sliding of the seats.

It is an object of my invention to provide means for seating and unseating the valve plates of gate valves by more simple and more efficient means than the usual threaded spindles of opposite hands, and to this end instead of the usual threaded spindle intermediate the two valve plates I provide an element which is in fact a symmetrical wedge but, as it has some resemblance to a herringbone rack, will be referred to as such. With a rack of this kind having not less than one tooth of V-shape, or elements corresponding to such a tooth, the same effect is achieved as with two threaded spindles of opposite hands, and it is obvious that this not only enormously simplifies the valve as compared with the usual threaded elements but also has the advantage of increased efficiency, as the efficiency of a thread is very poor.

For convenience in construction the rack is preferably not flat but circular, having the form of a spindle with its teeth projecting on either side of its axis. In order to distribute the thrust, a plurality of teeth is generally provided, instead of a single tooth.

It is another object of my invention to provide a valve of this type in which deformation of the valve plates and consequent leakage, unequal wear and frictional resistance during the opening and closing periods of the valve are eliminated.

In valves of this kind as heretofore designed in which the valve plates were displaced axially through the medium of a threaded pin in the axis of the plates to which rotation was imparted from the spindle through the medium of links or racks and sectors, the thrust of the threaded pin acted on the centres of the valve plates so that deformation of the plates was inevitable and, due to this deformation, the thrust was not distributed uniformly over the valve seats, causing leakage and damage to the faces of the seats.

Another drawback of the central action is that the pin, being of small diameter, requires a considerable length of thread by which the width of the valve is increased and this increased width also increases the pressure gradient in the valve which is a function of its width.

It is another object of my invention to provide a valve in which the spindle is relieved from any transverse forces due to the pressure of the fluid, such forces causing binding of the spindle, wear of the stuffing box, and sliding of the valve plates on their seats during the opening and closing periods. In order to overcome such obnoxious phenomena the spindle had to be of excessively large diameter.

These drawbacks of the existing gate valves are particularly undesirable in modern steam plants in view of the high pressures and temperatures prevailing therein. It has already been proposed to provide automatic or non-automatic by-pass means in connection with the gate valve of such plants, but this solution is not satisfactory, as the by-pass, if automatic, is liable to fail and, if not automatic, is as a rule neglected by the attendant. With an automatic by-pass therefore, permanent leakage, and with a non-automatic by-pass, damage to the very sensitive seating faces is inevitable.

These drawbacks are overcome according to this invention in which the valve plates are forced tightly on the seats without being subject to deformation and its consequences. The new valve is of simple design, but absolutely reliable and also absolutely tight even with high pressure steam. The pressure gradient is a minimum and wear is practically nil so that the life of the valve is almost unlimited.

Each valve plate or its extension is provided with grooves or similar means for absorbing the thrust exerted by the rack. Obviously in any case—and I am not limited to any particular form or combination of means for translating rotary motion into axial thrust—the connection must be such that upon rotation of the sleeve the valve plates will move in opposite directions. Rotation is imparted to the sleeve or its parts, if it is divided, through the medium of links or the like connected with the spindle. In this manner a purely axial motion of the valve plates at right angles to their seats is effected so that unequal pressure and wear are eliminated.

By dividing the sleeve into two parts which may be rotated in unison with respect to the extensions of the valve plates and to each other, it is possible to provide means for holding the valve in position during the opening and closing periods so that the valve plates will only be displaced after the valve has assumed its proper position with respect to its seats.

In the drawings affixed to this specification and forming part thereof a gate valve embodying my invention is illstrated diagrammatically by way of example.

In the drawings:

Fig. 1 is an axial section of the valve and its casing,

Fig. 2 is a transverse section,

Fig. 3 shows the arrangement of two grooves in a pair of valve plates, and

Fig. 4 shows a similar arrangement with a set of grooves for each plate.

Referring to the drawings, 1 and 2 are the connecting flanges of the valve casing 3. 4, 4 are seats on opposite sides of the valve and 5 and 6 are the two valve plates, each of which cooperates with one of the seats and is provided with a seating insertion 37 and 38, which may be resilient. Means must be provided for preventing rotation of the plates with respect to each other and to this end they may be provided with telescopic inward extensions 7 and 8 which are splined or otherwise connected against rotation.

Each extension 7 and 8 is provided with circumferential teeth $a$, $b$, and $c$, $d$ as will appear from Fig. 3. This figure shows the extensions 7 and 8 developed and it will appear that the teeth $a$, $b$ and $c$, $d$ are inclined in opposite directions like the teeth of a herringbone rack the axis of which coincides with the axis of the extensions about which the rack is supposed to be wound. As shown in Fig. 4, the single teeth $a$, $b$, $c$, $d$ may be replaced by sets A, B, C, D of parallel teeth. Similar teeth are formed on the annuli 12 and 13 which make up the divided sleeve referred to, it being understood, of course, that a groove in one part corresponds to a projection on the other as in mating male and female threads. The important point is that the wedge action of my novel element is attained. The teeth as illustrated are not complete V-shaped teeth as in the usual herringbone racks, their pointed ends being cut away, but I am not limited to teeth of this type.

The annuli 12 and 13 are held against axial displacement by shoulders 39 in the casing 3 between which they fit with slight clearance. The annuli are arranged diametrically opposite each other and extend only over part of the extensions 7, 8 on which they are seated so that they are free to be rotated through a certain angle on the extensions, as will appear from Fig. 2.

The hollow spindle 14 extends through a stuffing box 41 at the top of the casing and cooperates with a solid threaded spindle 42 on which is secured a hand wheel 43. 15 is a cross head secured at the lower end of the hollow spindle, 16 and 17 are pins at the ends of the cross head, 18 and 19 are links connected to the pins, and 22, 23 are pins in lugs 24 and 25 of the annuli 12, 13 respectively. A roller 20 and 21 is secured on each pin 22 and 23 respectively. 35 and 36 are lugs arranged at about 90° to the lugs 24 and 25. The rollers 20, 21 and 33, 34 move on circular tracks 26 and 27 in the casing 3 which melt into parallel tracks 28 and 29 in the cylindrical upper part of the casing 3. Hoops 31 and 32 are placed on both annuli near their ends and secured to one of them, for instance 13, by means of screws 30.

The operation of this valve is as follows:

If it is desired to open the valve, the hand wheel 43 is rotated so as to raise the spindle 14 with the cross head 15 and this parallel motion is changed into rotary motion of the annuli 12 and 13 and this rotation is translated into axial displacement of the plates 5 and 6 away from their respective seats 4, 4 so that the faces of the plates are moved out of contact with the seats 4 and will not slide on them when the valve is raised. The valve can only be raised after the distance between the rollers 20, 21 has been reduced so far as to permit them to run on the parallel tracks 28 and 29.

In order to close the valve the hand wheel 43 is rotated in opposite direction until the rollers 33 and 34 are in position on their respective tracks 26 and 27, and the seating insertions 37 and 38 are opposite the seats 4, 4. On further downward motion of the spindle 14 the annuli 12, 13 are rotated in opposite directions, causing the valve plates 5 and 6 to be moved axially, but also in opposite directions, that is away from each other so as to force them onto the seats 4, 4.

The pressure of the spindle is equally distributed to either side on the two plates 5 and 6 so that they are moved axially toward or away from the seats 4, 4 in exactly parallel position. The pressure is transmitted along a cylindrical surface the diameter of which is about equal to that of the seats 4, 4 so that bending stress is not exerted on the plates 5 and 6 and the only pressure exerted on them is the uniformly distributed steam pressure. This is move favorable than the usual arrangement in which the pressure of the spindle is transmitted to the centre of the valve plates and leakage due to deformation or wear will not occur even if the valve is used for a long period.

It will be understood that a valve of this kind is particularly suitable for operation under exacting conditions, for instance in high-pressure steam lines.

I wish it to be understood that I do not desire to be limited to the exact details of construction shown and described for obvious modifications will occur to a person skilled in the art.

I claim:—

1. A gate valve comprising a casing, a valve body adapted to be displaced in said casing and to cooperate with seats in said casing on opposite sides of said valve body, said valve body comprising valve plates adapted to engage said seats, a rotary member held against axial displacement in said casing and seated on said valve plates, means for imparting rotary motion to said member, and wedge elements on said rotary member and said valve plates in oppositely inclined relationships for translating the rotary motion of said member into opposite axial motion of said valve plates.

2. A gate valve comprising a casing, a valve body adapted to be displaced in said casing and to cooperate with seats in said casing on opposite sides of said valve body, said valve body comprising valve plates adapted to engage said seats, a rotary member held against axial displacement in said casing and seated on said valve plates, means for imparting rotary motion to said member, wedge elements on said rotary member and said valve plates in oppositely inclined relationships for translating the rotary motion of said member into opposite axial motion of said valve plates, and means on said rotary member and on said casing for preventing displacement of the valve body with respect to said casing until the motion imparted to said valve plates by said member has been completed.

3. A gate valve comprising a casing, a valve body adapted to be displaced in said casing and to cooperate with seats in said casing on opposite sides of said valve body, said valve body comprising valve plates adapted to engage said seats, a rotary member held against axial displacement in said casing and seated on said valve plates, means for imparting rotary motion to said member, and wedge elements on said rotary member and said valve plates in oppositely inclined relationships for translating the rotary motion of said member into opposite axial motion of said valve plates, said elements being so arranged that the thrust exerted by them is transmitted onto said seats in a straight line.

4. A gate valve comprising a casing, a valve body adapted to be displaced in said casing and to cooperate with seats in said casing on opposite sides of said valve body, said valve body comprising valve plates adapted to engage said seats, a rotary member held against axial displacement in said casing and seated on said valve plates, means for imparting rotary motion to said member, and wedge elements on said rotary member and said valve plates in oppositely inclined relationships for translating the rotary motion of said member into opposite axial motion of said valve plates, the diameter on which said elements exert thrust on said plates being substantially equal to the mean diameter of said plates.

5. A gate valve comprising a casing, a valve body adapted to be displaced in said casing and to cooperate with seats in said casing on opposite sides of said valve body, said valve body comprising valve plates adapted to engage said seats, a rotary member subdivided into two sleeves which are adapted to be displaced radially with respect to each other, said sleeves being held against axial displacement in said casing and seated on said valve plates, means for imparting rotary motion to said sleeves, and wedge elements on said sleeves and said valve plates in oppositely inclined relationships for translating the rotary motion of said sleeves into opposite axial motion of said valve plates.

6. A gate valve comprising a casing, a valve body adapted to be displaced in said casing and to cooperate with seats in said casing on opposite sides of said valve body, said valve body comprising valve plates adapted to engage said seats, a rotary member subdivided into two sleeves which are adapted to be displaced radially with respect to each other, said sleeves being held against axial displacement in said casing and seated on said valve plates, a spindle adapted to be displaced axially in said casing, means operatively connected with said spindle and said sleeves for imparting opposite rotary motion to said sleeves, and wedge elements on said member and said valve plates in oppositely inclined relationships for translating the rotary motion of said sleeves into opposite axial motion of said valve plate.

7. A gate valve comprising a casing, a valve body adapted to be displaced in said casing and to cooperate with seats in said casing on opposite sides of said valve body, said valve body comprising valve plates adapted to engage said seats, a rotary member subdivided into two sleeves which are adapted to be displaced radially with respect to each other, shoulders in said casing abutting against opposite ends of said sleeves so as to hold them against axial motion, said sleeves being seated on said valve plates, means for imparting rotary motion to said sleeves, and wedge elements on said sleeves and said valve plates in oppositely inclined relationships for translating the rotary motion of said sleeves into opposite axial motion of said valve plates.

8. A gate valve comprising a casing, a valve body adapted to be displaced in said casing and to cooperate with seats in said casing on opposite sides of said valve body, said valve body comprising valve plates adapted to engage said seats, a rotary member subdivided into two sleeves which are adapted to be displaced radially with respect to each other, said sleeves being held against axial displacement in said casing and seated on said valve plates, means for imparting rotary motion to said sleeves, wedge elements on said sleeves and said valve plates in oppositely inclined relationships for translating the rotary motion of said sleeves into opposite axial motion of said valve plates, a track in said casing which is partly concentric to the axis of said valve and partly parallel to the direction in which said valve body is displaced and a pair of rollers on each sleeve arranged at an angle and adapted to run on said track.

9. A gate valve comprising a casing, a valve body adapted to be displaced in said casing and to cooperate with seats in said casing on opposite sides of said valve body, said valve body comprising valve plates adapted to engage said seats, a rotary member subdivided into two sleeves which are adapted to be displaced radially with respect to each other, a hoop surrounding said sleeves, said sleeves being held against axial displacement in said casing and seated on said valve plates, means for imparting rotary motion to said sleeves, and wedge elements on said sleeves and said valve plates for translating the rotary motion of said sleeves into opposite axial motion of said valve plates.

10. A gate valve comprising a casing, a valve body adapted to be displaced in said casing and to cooperate with seats in said casing on opposite sides of said valve body, said valve body comprising valve plates adapted to engage said seats, a rotary member subdivided into two sleeves which are adapted to be displaced radially with respect to each other, a hoop surrounding said sleeves, and secured to one of them, said sleeves being held against axial displacement in said casing and seated on said valve plates, means for imparting rotary motion to said sleeves, and wedge elements on said sleeves and said valve plates for translating the rotary motion of said sleeves into opposite axial motion of said valve plates.

11. A gate valve comprising a casing, a valve body adapted to be displaced in said casing and to cooperate with seats in said casing on opposite sides of said valve body, said valve body comprising valve plates adapted to engage said seats, a rotary member held against axial displacement in said casing and seated on said valve plates, means for imparting rotary motion to said member, and herringbone teeth on said rotary member and said valve plates arranged in oppositely inclined relationships for translating the rotary motion of said member into opposite axial motion of said valve plates.

12. A gate valve comprising a casing, a valve body adapted to be displaced in said casing and to cooperate with seats in said casing on opposite sides of said valve body, said valve body comprising valve plates adapted to engage said seats, a spindle held against axial displacement in said casing and seated on said valve plates, herringbone teeth formed on said spindle and curved concentrically therewith, and corresponding herringbone teeth on the seats of said spindle on said valve plates arranged in oppositely inclined relationships for translating the rotary motion of said spindle into opposite axial motion of said valve plates.

In testimony whereof I affix my signature.

FRANZ SEIFFERT.